Feb. 11, 1964 W. STAHLECKER 3,120,681
TWO-BELT DRAWING MECHANISM FOR SPINNING MACHINES
Filed March 11, 1960 3 Sheets-Sheet 1

INVENTOR
WILHELM STAHLECKER
BY
ATTORNEYS

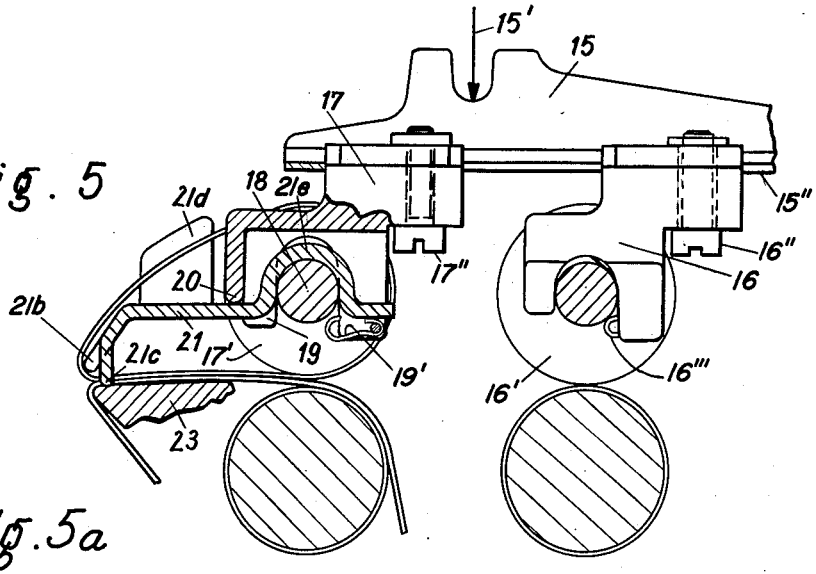
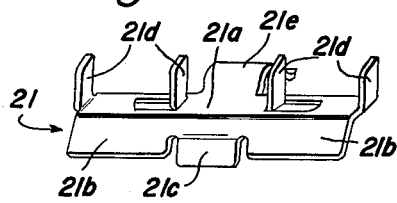
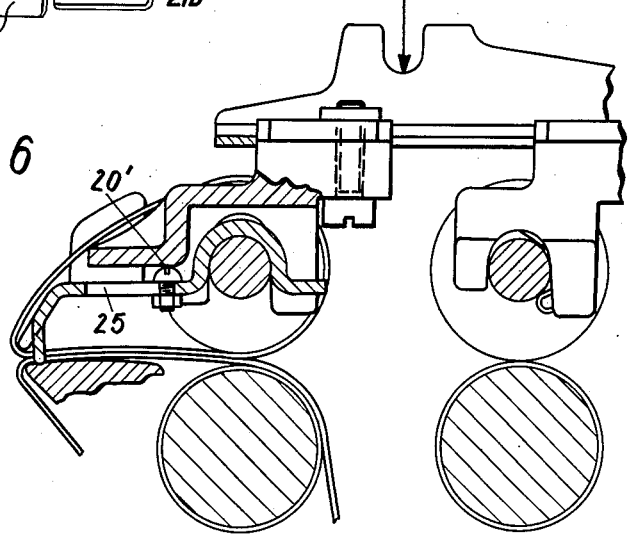

Feb. 11, 1964 W. STAHLECKER 3,120,681
TWO-BELT DRAWING MECHANISM FOR SPINNING MACHINES
Filed March 11, 1960 3 Sheets-Sheet 3

INVENTOR
WILHELM STAHLECKER
BY Dicke, Craig & Freudenberg
ATTORNEYS

United States Patent Office 3,120,681
Patented Feb. 11, 1964

3,120,681
TWO-BELT DRAWING MECHANISM FOR
SPINNING MACHINES
Wilhelm Stahlecker, Ross-Steige 28, Tieringen, near
Balingen, Baden-Wurttemberg, Germany
Filed Mar. 11, 1960, Ser. No. 14,497
Claims priority, application Germany Mar. 14, 1959
3 Claims. (Cl. 19—252)

The present invention relates to a two-belt drawing mechanism for spinning machines with separate guiding means for the upper and lower belts.

In two-belt drawing mechanisms with separate guiding means for the upper and lower belts it is necessary in the operating position to lock the guiding means of the upper belts to those of the lower belts. This manner of locking may be carried out either by special guide means for the cage of the upper belt, or by means of screw connections, hooks, or the like. The manner of locking may, however, also be by means of special springs which are acting, for example, upon the shaft of the rollers of the upper belts or upon the loading device.

If the positive locking manner is applied, the guiding means of the upper belts can usually be separated from the guiding means of the lower belts only by an additional manipulation which is usually very difficult to perform within the confined space available.

If the locking manner by means of springs is applied, the force with which the guiding means of the upper belts are connected to the guiding means of the lower belt is usually opposed to the load acting upon the rollers of the upper belts so that, partly due to the usual complicated shape of the springs and partly due to the fact that because of the lack of sufficient space the spring diagram is unfavorable, the load acting upon the rollers of the upper belts varies considerably and cannot be controlled.

It is an object of the present invention to overcome these disadvantages of the known manners of locking the guiding means of the upper belts to those of the lower belts by loading the rollers of the upper belts by means of the guiding element of the upper belts in such a manner that this element will take up the load and distribute the same by leverage in the form of a contact pressure and loading pressure to the rollers of the upper belts.

This and other objects and features of the present invention will become further apparent from the following detailed description, particularly when the same is read with reference to the accompanying drawings, in which—

FIGURE 5 shows a side view, partly in cross section, of a modification of the guide means of the upper belts which transmits the load upon the shaft of the upper belt rollers and is, in turn, acted upon by a load-transmitting bridge which also carries the intake roller;

FIGURE 5a shows a perspective view of one of the guide members of the guide means of FIGURE 5;

FIGURE 6 shows a view similar to FIGURE 5 of another modification of the guide element on a load-transmitting bridge, in which the load-transmitting point on the guide element is adjustable;

Figure 7:
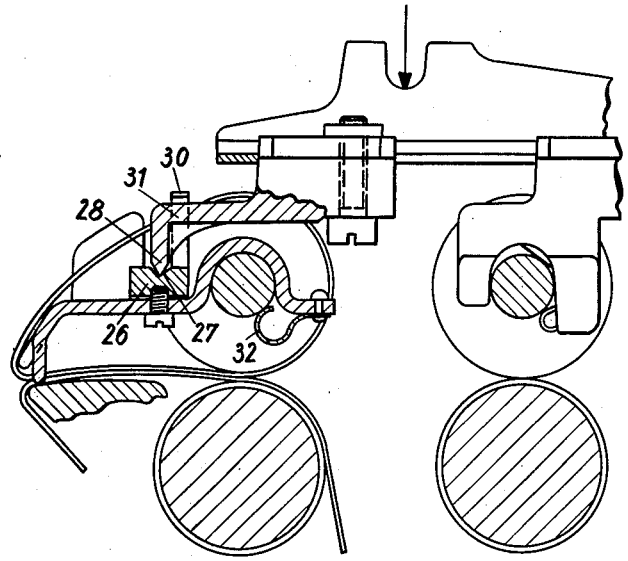
Figure 8:
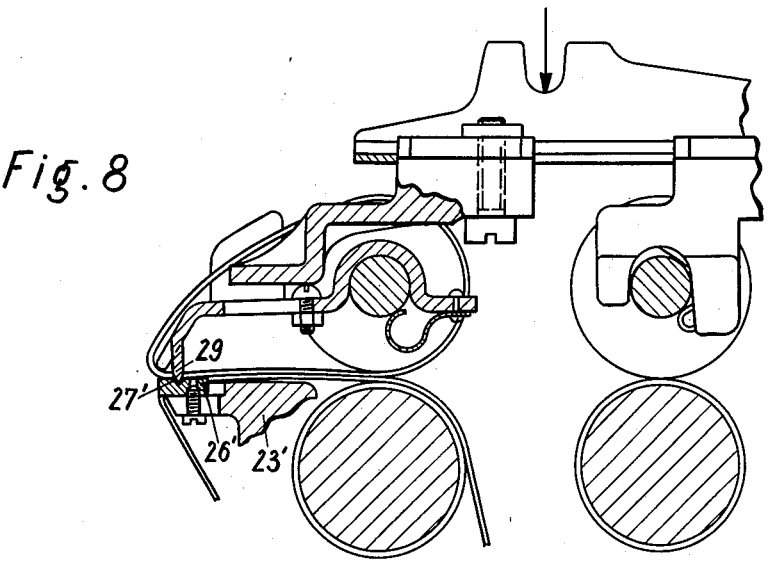

FIGURE 7 shows a view similar to FIGURES 5 and 6 of a further modification of the guide element, which transmits the load to the shaft of the upper-belt rollers and also serves as a supporting member for mounting the shaft; while FIGURE 8 shows a similar view of still another modification of the guide element which transmits the load to the shaft of the upper-belt rollers, serves as a supporting member of the shaft, and permits the load-transmitting point thereof to be adjusted.

Figure 1:
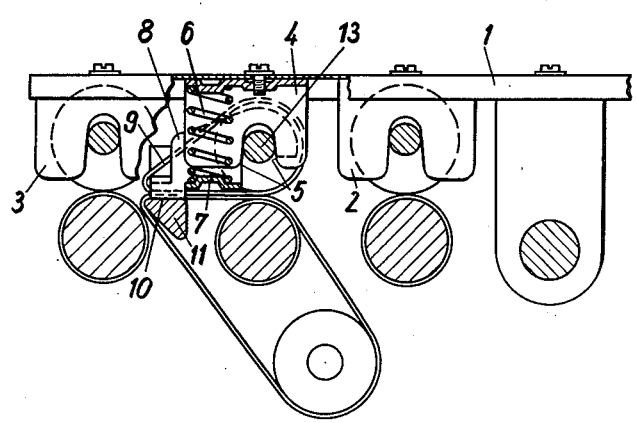
FIGURE 1 shows a side view partly in cross section of a guide element for the upper belts which transmits the load to the rollers of the upper belts and is installed in a loading arm in which both upper rollers are acted upon by the pressure of a single spring.
Figure 2:
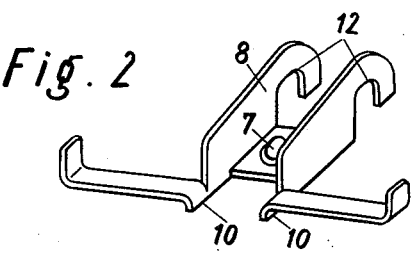
FIGURE 2 shows a perspective view of the guide element for the upper belts as shown in FIGURE 1.

Referring to the drawings, FIGURE 1 shows a guiding and load-transmitting arm 1 which is provided with bearing elements 2 and 3 for supporting the intake and delivery rollers. Arm 1 also carries a bearing element 4 with recesses forming guide surfaces 5 for supporting the shaft 13 of the rollers of the upper belts 9. Between the side arms of bearing element 4 a guide element 8 is mounted which is adapted to guide the upper belts 9 and is illustrated in detail in FIGURE 2. Between bearing element 4 and a bearing point 7 on guide element 8 a coil spring 6 is mounted which exerts a pressure upon guide element 8. At one end which also carries the belt guide arms, guide element 8 has lower projecting portions 10 which engage with and rest upon the reversing bar 11 for the lower belt. At the other end, the two side arms of guide element 8 have hooklike portions formed by recesses 12 into which shaft 13 of the upper rollers is inserted. Due to the engagement of projections 10 with the reversing bar 11 of the lower belts and the pressure exerted by spring 6 upon guide element 8, the latter acting as a one-arm lever is pivoted about points 10 so that the walls of recesses 12 will press upon shaft 13 and transmit the load thereto which is combined of the load acting upon arm 1 and the force exerted by spring 6, and which may be very accurately determined from these forces and the leverage of guide element 8.

Figure 4:
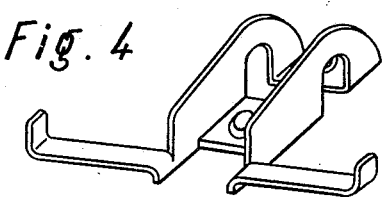
FIGURE 4 shows a perspective view of the guide element according to FIGURE 3.
Figure 3:
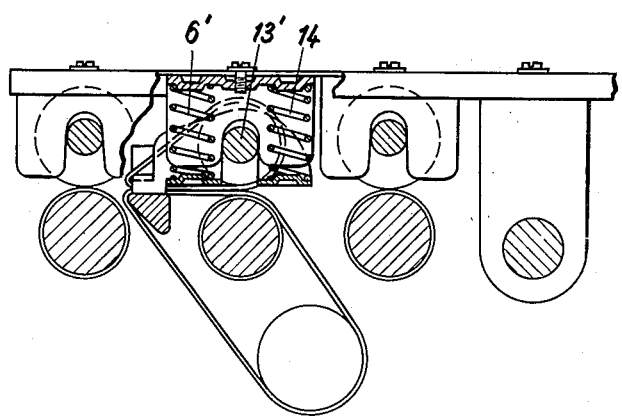
FIGURE 3 shows a side view, partly in cross section, of a guide element for the upper belts in which the load is transmitted to the rollers of the upper belts by means of two springs of different strength, one of which is mounted in front of and the other behind the shaft of the upper rollers.

FIGURES 3 and 4 illustrate a similar loading device in which, however, two springs 6' and 14 are provided in front of and behind shaft 13', respectively, both of which act upon the guide element. Since spring 6' is made of a greater strength than spring 14, the effect of guide element 8 in its action as a loading member for the shaft of the upper-belt rollers remains the same as in FIGURE 1 and the loading pressure upon shaft 13' will even be increased by spring 14.

FIGURE 5 shows a load-transmitting bridge 15 which is acted upon by a force 15'. Guide bars 15" are provided on the bridge 15 and a guide element 16 for the intake roller 16' of the drawing mechanism is adjustably guided thereon along the plane of the drawing. A screw 16" serves for fastening the guide element 16. Also adjustably secured to the bridge 15 by screw 17" is a load-transmitting and guide element 17 for the upper belt roller, the element 17 also being adjustably guided on guide bars 15". This guide element 17 has leg portions 19 which partially enclose the spindle 18 of the upper belt roller 17' and thus guide this roller therewith. A spring 19' arranged on the leg portion 19 prevents the upper belt roller from falling out of the guide element 17 when the bridge 15 is raised. Moreover, an angular extension 20 is provided on the guide element 17, the end of which presses on a guide member 21 consisting of a bridge portion 21a, the reversing bar 21b for the upper belts, the supporting nose portion 21c, the lateral guide surfaces 21d and the U-shaped part 21e for receiving spindle 18, FIGURE 5a showing these parts in a perspective view of guide member 21. This guide member 21 abuts with the end of its supporting nose portion 21c on the reversing bar 23 for the lower belts and is thus pivotable about the line of contact therewith so that the U-shaped end 21e is pressed onto the spindle 18 by the force acting on the bridge 21a via the angular portion 20 in a direction toward the lower belt roller. The guiding plates 21d of the guide member, which may comprise bent portions of member 21 or portions welded thereto, guide the upper belt laterally. Accordingly, in this embodiment of the present invention, guide member 21 acts as a one-armed lever which is pivotally positioned at the end of the supporting nose portion 21c on the guide bar 23 for the lower belts and exerts a loading pressure upon the spindle 18 of the upper belt roller.

FIGURE 6 illustrates a device which is similar to that shown in FIGURE 5, except for the fact that the load-transmitting point 20' is adjusted. The load-transmitting element consists of a semicircular rod which extends over the width of the central part of the guide member and is adjustable relative to the shaft of the upper roller by one or more bolts in a slot 25 of the guide member. It is thus possible to adjust the leverage of the guide member which likewise forms a one-arm lever.

The embodiment of the invention according to FIGURE 7 differs from that according to FIGURE 5 primarily by the fact that the guide member of the upper belt also serves as a means for guiding the upper roller so as to prevent it from shifting in a direction transverse to its axis relative to the lower roller. For this purpose, a separate member 26 with a V-shaped groove 27 is screwed to the central part of the guide member, and a knife edge 28 on the lower end of the guide member engages into this groove 27 and thus prevents the guide member and the shaft of the upper roller from shifting laterally. In order to prevent the guide member from separating from the upper roller when the load-transmitting bridge is being lifted and to permit the entire unit, i.e., the upper roller with its shaft together with the guide member and the upper belt, to be lifted together with the load-transmitting bridge, the free end of the guide member carries a spring 32 which engages with the shaft of the upper roller and thus retains the guide member in connection with the shaft, while a spring arm 30 is secured to the member 26 containing the V-shaped groove 27 and thus to the guide member itself. The upper end of this spring arm 30 overlaps the horizontal upper edge of the load-transmitting arm 31 so that, when the bridge is lifted, arm 31 will engage with spring arm 30 and take along the entire unit.

Slots are provided in the upper guide member to accommodate the member 26 and its associated screw means whereby the position of member 26 may be adjusted relative to the lower guide member. The upper end of the load-transmitting arm 31 is adjustably disposed upon the load-transmitting bridge. Since the load-transmitting arm 31 terminates at its lower end in the knife-edge 28 which rests in the V-shaped groove 27 of the member 26, displacement of the load-transmitting arm 31 will similarly displace the member 26, the upper belt cage, and the upper belt roller means.

FIGURE 8 illustrates another modification of the invention similar to the embodiments according to FIGURES 5 to 7. The guide member of the upper belt is also in this case connected to the shaft of the upper roller by a spring and it also serves to prevent the upper roller from shifting in a direction transverse to its axis relative to the lower roller. For this purpose, a member 26' containing a V-shaped groove 27' is adjustably secured by a screw-and-slot connection to the reversing bar 23' of the lower belt, and the lower end of the guide member is provided with a knife edge 29 which engages into groove 27'. Thus, it is possible to adjust the position of the upper roller relative to the lower roller, and also to prevent the upper roller including the guide member and the upper belt thereon from shifting in a direction transverse to the axis of the lower roller. Furthermore, the load-transmitting point between the load-transmitting arm and the guide member of the upper belt is likewise adjustable in the same manner as described with reference to FIGURE 6.

Although this invention has been illustrated and described with reference to the preferred embodiments thereof it should be understood that it is in no way limited to the details of such embodiments, but is capable of numerous modifications within the scope of the appended claims.

The invention having now been fully disclosed, what is claimed is:

1. A two-belt drawing mechanism for spinning machines comprising upper belts and lower belts, separate guiding means for said upper and lower belts including upper and lower roller means for supporting said upper belts and aid lower belts respectively and having respective shaft means, a load-transmitting bridge, an intake roller, a guide element for said intake roller being longitudinally adjustable upon said load transmitting bridge, a guide element for said upper roller means having arm portions engaging the shaft means of said upper roller means, means securing said guide element for said upper roller means to said load transmitting bridge to enable longitudinal adjustment thereupon, a reversing bar for said lower belts, the guiding means for said upper belts further including a guide member effectively constituting a one-armed lever pivotally mounted at one end on said reversing bar and engaging said shaft means of said upper roller means adjacent the other end thereof, said guide element for said upper roller means engaging said guide member intermediate the ends thereof to transmit a loading force to said guide member and therewith to said upper roller means.

2. A two-belt drawing mechanism for spinning machines, having upper belts and lower belts, separate guiding means for said upper and lower belts comprising upper and lower roller means for supporting said upper belts and said lower belts, respectively, shaft means for each of said roller means, a load transmitting bridge, a guide element for said upper roller means having arm portions in supporting engagement with the shaft means of said upper roller means, means securing said guide element to said load transmitting bridge to enable longitudinal adjustment thereupon, a guiding element for said lower belts, the guiding means for said upper belts further comprising a guide member effectively constituting a one armed lever pivotally mounted at one end on said guiding element for said lower belts and having a U-shaped portion adjacent the other end thereof engaging said shaft means of said upper roller means, said guide element for said upper roller means comprising a depending load arm engaging said guide member intermediate the ends thereof to transmit a loading force to said guide member and therewith to said upper roller means.

3. A two-belt drawing mechanism for spinning machines having upper belts and lower belts, separate guiding means for said upper and lower belts comprising upper and lower roller means for supporting said upper and lower belts and having respective shaft means, a load transmitting bridge, a guide element for said upper roller means having essentially U-shaped side arm portions supporting the shaft means of said upper roller means to enable common movement of said load transmitting bridge, said guide element, and of said upper roller means, means securing said guide element to said load transmitting bridge to enable longitudinal adjustment thereupon, a guide element for said lower belts, the guiding means for said upper belts further including a guide member effectively constituting a lever pivotally mounted at one end of said guide element for said lower belts and having means adjacent the other end thereof engaging said shaft means of said upper roller means, said guide element for said upper roller means comprising a load arm engaging said guide member intermediate the ends thereof to transmit a loading force from said load transmitting bridge to said guide member and therewith to said upper roller means.

References Cited in the file of this patent

UNITED STATES PATENTS

| | | |
|---|---|---|
| 2,662,249 | Karl-Hans Neu | Dec. 15, 1953 |
| 2,751,631 | Hunter et al. | June 26, 1956 |
| 2,789,320 | Dausch | Apr. 23, 1957 |
| 2,927,348 | Tarbox | Mar. 8, 1960 |

FOREIGN PATENTS

| | | |
|---|---|---|
| 946,875 | Germany | Aug. 9, 1956 |
| 949,995 | Germany | Sept. 27, 1956 |
| 702,404 | Great Britain | Jan. 13, 1954 |
| 718,926 | Great Britain | Nov. 24, 1954 |